US011281737B2

(12) United States Patent
Catalano et al.

(10) Patent No.: US 11,281,737 B2
(45) Date of Patent: *Mar. 22, 2022

(54) UNBIASING SEARCH RESULTS

(71) Applicant: INTERNATIONAL BUSINESS MACHINES CORPORATION, Armonk, NY (US)

(72) Inventors: Pasquale A. Catalano, Walkill, NY (US); Andrew G. Crimmins, Montrose, NY (US); Arkadiy O. Tsfasman, Wappingers Falls, NY (US); John S. Werner, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 85 days.

This patent is subject to a terminal disclaimer.

(21) Appl. No.: 16/732,382

(22) Filed: Jan. 2, 2020

(65) Prior Publication Data

US 2020/0142938 A1  May 7, 2020

Related U.S. Application Data

(63) Continuation of application No. 15/237,903, filed on Aug. 16, 2016, now Pat. No. 10,552,497.

(51) Int. Cl.
*G06F 16/248* (2019.01)
*G06F 16/9535* (2019.01)
(Continued)

(52) U.S. Cl.
CPC ........ *G06F 16/9535* (2019.01); *G06F 16/248* (2019.01); *G06F 16/24575* (2019.01);
(Continued)

(58) Field of Classification Search
CPC .. G06F 16/9535; G06F 16/9558; G06F 16/35; G06F 16/24575; G06F 16/951; G06F 16/248
See application file for complete search history.

(56) References Cited

U.S. PATENT DOCUMENTS 6,006,225 A * 12/1999 Bowman ............. G06F 16/3325
707/E17.063
8,577,911 B1 * 11/2013 Stepinski ............ G06F 16/3328
707/765

(Continued)

OTHER PUBLICATIONS

IBM, List of IBM Patents or Patent Applications Treated as Related, Appendix P, dated Jan. 3, 2020, 2 pages.

*Primary Examiner* — Kannan Shamugasundaram
(74) *Attorney, Agent, or Firm* — John Noh (57) ABSTRACT

Anonymizing product search results. Keywords related to a product are received. For each keyword, an associated list of terms, which lists the keyword and one or more additional terms that are closely related to the keyword, is generated. A combination list that includes combinations of terms selected from the associated lists of terms, where each combination includes two or more terms and at least one combination includes terms from different associated lists of terms, is created. A search, based on the combinations of terms in the combination list, is performed and online content is received. Based on product information in the online content, a list of products is generated. An anonymized list of products is generated from the list of products by masking product brand names of the products in the list of products. The anonymized list of products is presented on a user interface.

20 Claims, 8 Drawing Sheets

(51) Int. Cl.
*G06Q 30/06* (2012.01)
*G06F 16/955* (2019.01)
*G06F 16/2457* (2019.01)
*G06F 16/35* (2019.01)
*G06F 16/951* (2019.01)

(52) U.S. Cl.
CPC ............ *G06F 16/35* (2019.01); *G06F 16/951* (2019.01); *G06F 16/9558* (2019.01); *G06Q 30/0625* (2013.01)

(56) References Cited

U.S. PATENT DOCUMENTS

| | | | |
|---|---|---|---|
| 9,361,716 B1 | 6/2016 | Erikson | |
| 9,843,624 B1 | 12/2017 | Taaghol | |
| 10,375,009 B1 | 8/2019 | Fishman | |
| 2001/0047332 A1 | 11/2001 | Gonen-Friedman | |
| 2006/0047649 A1* | 3/2006 | Liang | G06F 16/951 707/999.004 |
| 2006/0129446 A1* | 6/2006 | Ruhl | G06F 16/951 707/E17.111 |
| 2011/0270678 A1 | 11/2011 | Drummond | |
| 2012/0041768 A1* | 2/2012 | Reese | G06F 16/951 705/1.1 |
| 2014/0380304 A1 | 12/2014 | Salehi | |
| 2015/0067019 A1 | 3/2015 | Balko | |
| 2015/0187038 A1 | 7/2015 | Johnson | |
| 2016/0180602 A1 | 6/2016 | Fuchs | |
| 2017/0076495 A1 | 3/2017 | Gabrys | |
| 2017/0293501 A1 | 10/2017 | Barapatre | |
| 2017/0293705 A1 | 10/2017 | Van Der Velden | |
| 2018/0033203 A1 | 2/2018 | Ligameri | |
| 2018/0052932 A1 | 2/2018 | Catalano | |
| 2018/0053235 A1 | 2/2018 | Catalano | |
| 2018/0116070 A1 | 4/2018 | Broadbent | |
| 2018/0218005 A1 | 8/2018 | Kuhtz | |
| 2018/0219410 A1 | 8/2018 | Harris | |
| 2018/0366090 A1 | 12/2018 | Shatzki | |
| 2019/0002076 A1 | 1/2019 | Markley | |
| 2019/0146945 A1 | 5/2019 | Won | |
| 2019/0197982 A1 | 6/2019 | Chi | |
| 2019/0373521 A1 | 12/2019 | Crawford | |

* cited by examiner

UNBIASING SEARCH RESULTS

BACKGROUND

The present invention relates generally to the field of information retrieval, and more particularly to unbiasing search results.

SUMMARY

Embodiments of the present invention disclose a computer-implemented method, computer program product, and system for anonymizing product search results. Two or more keywords related to a product are received by a first computer from a second computer, over a network, via a user interface on the second computer. The first computer generates for each keyword of the two or more keywords an associated list of terms, which lists the keyword and one or more additional terms that are closely related to the keyword based on the keyword appearing with at least a predetermined frequency in searches for the additional terms. The first computer creates a combination list that includes combinations of terms selected from the associated lists of terms, where each combination includes two or more terms and at least one combination includes terms from different associated lists of terms. The first computer performs a search based on the combinations of terms in the combination list and receives online content. The first computer generates a list of products, based on product information in the online content. The first computer generates an anonymized list of products from the list of products by masking product brand names of the products in the list of products. The first computer transmits the list of products and the anonymized list of products over the network, for presentation on the user interface on the second computer.

DETAILED DESCRIPTION

Cognitive biases are tendencies to think in certain ways that can lead to systematic deviations from a standard of rationality or good judgment. Such biases may affect business and economic decisions, leading to suboptimal, or even erroneous, choices or actions. One example of cognitive bias is when people react to a particular presented choice in different ways depending on how the choice is presented. Another common example is the tendency to express an undue liking for certain things merely because of familiarity with them or because many other people do or believe the same.

Decisions are often influenced by emotion and pre-existing bias, whether conscious or unconscious. How a person makes a choice can also be influenced by the way individual options are presented or framed. For example, branding and marketing may make one product or service appear superior to another functionally identical one. As a result, people often reduce the scope of their options when making a decision, potentially causing them to overlook or disregard better options.

For example, when choosing a new car, consumers often start by narrowing the list of options to a handful of brands, based on their knowledge of those brands' reputations, which may be faulty or based on outdated information. They may discount or fail to consider the current reputation of other brands. A decision based on past experience or brand preferences may fail to weigh current critical reviews or complaints, for example, about reliability, and may overlook brands that may have significantly increased in product quality more recently.

In another example, an employee involved in procuring goods for a company may choose products from vendors they prefer or have personal knowledge of, despite the availability of functionally identical, cheaper options.

According to various sources, more than 80% of consumers in the U.S. perform online research before purchasing products, whether online or in-store. Similarly, a vast majority of those seeking various services use a search engine to aid in their decision. Typically, a user enters into a search engine a description of a product or service, which may specify preferred brands, and is presented with a list, ranked according to various criteria, with brand names or other identifying features prominently displayed. Typically, the highest-ranked items are those most closely associated with the preferred brand. As a result, the top-listed items may reflect and reinforce the user's biases.

As used herein, the term "search" refers to the use of a search engine, such as Google, Yahoo!, or Bing, to search for information on the web, or in online or local databases or directories. All trademarks, service marks, trade names, and product names used herein are the property of their respective owners. The searches typically take the form of a keyword query, in which one or more keywords are input, and the search engine results are usually ranked, using a proprietary algorithm, by relevance to the query. Search results typically include a title, a link to the actual web page, and a short description, or snippet, showing where the keywords match content in the web page. In addition, search engines typically return an approximate count of the number of search results found for a given keyword query. Various search engine application programming interfaces (APIs), such as Google Custom Search Engine API or Microsoft Bing API, enable developers to embed a custom search component in their applications.

The term "product" as used herein includes goods and services. A brand, which is sometimes referred to as a make, is a name, term, design, symbol, or other identifier of a particular seller's good or service, and distinguishes that product from those of other sellers. A brand may identify a single item or a group of items. Often, a brand is also trademark. For example, BMW is a brand name, or make, of automotive vehicle, and xDrive is the brand name for the all-wheel drive system found in certain BMW vehicles.

Embodiments of the present invention disclose a computer-implemented method, computer program product, and system for anonymizing search results. In general, a user inputs a product description, which may include keywords that identify, characterize, or categorize the product, and features the product should have. The list of keywords is expanded to cover a wider range of products. The system finds products that match the expanded keyword list and anonymizes the list by masking product brands and branded features, for example, by redacting the brand names or by replacing them with generic or otherwise representative terms. A brand name may be redacted, for example, by formatting or modifying it so as to make it unrecognizable. Such a system may ensure that the user is not introducing conscious or unconscious bias into the search process, which may mitigate the influence of personal bias, branding, and marketing in decision making, using a system that may enable users to discover options or products they may have previously overlooked or disregarded.

In certain embodiments, the user may be presented, via a graphical user interface (GUI), the anonymized product list, configured such that the branding and additional product information, such as product feedback, may be revealed, or unmasked, when a specific product in the list is selected by the user, for example by clicking on a hyperlink.

Tokenization refers to a process in natural language processing (NLP) in which text is segmented into linguistic units such as words, punctuation, numbers, alpha-numerics, etc. Once this is done, linguistically significant and useful units, called tokens, may be identified. For example, stop words, i.e., meaningless tokens, such as prepositions and articles (definite and indefinite), and other irrelevant terms, may be removed from the set of tokens. Tokenization is typically one of the first steps in natural language processing of text. Other, common, NLP tasks include part-of-speech (POS) identification (e.g., as nouns, verbs, adjectives, prepositions, etc.), parsing to determine the grammatical structure of sentences (e.g., which groups of words go together as phrases and which words are the subject or object of a verb), and named entity recognition (NER), which identifies words or phrases in the text that are names of things, such as persons, places, companies, or brands. Software packages that provide various NLP functions include Natural Language Toolkit (NLTK), available in version 3.2 from nltk.org, and the Stanford CoreNLP Suite, available in version 3.6 from the Stanford NLP Group.

Topic modeling is a form of text mining that uses methods of machine learning and NLP to identify patterns in a corpus. A topic modeling tool groups words in the corpus into topics, which are clusters of words that frequently occur together. Topic models can connect words with similar meanings and distinguish between uses of words with multiple meanings. For example, a topic modeling tool applied to a corpus of movie reviews may determine the various genres present among the movies reviewed. A topic model is a statistical model that reveals the underlying semantic structure in a body of text. A common technique in topic modeling is latent Dirichlet allocation (LDA). A number of open source topic modeling packages, based on LDA and other techniques, are available, including the Stanford Topic Modeling Toolbox, version 0.4, from the Stanford Natural Language Processing Group and Apache Spark, version 2.0, available from the Apache Software Foundation.

Figure 1:
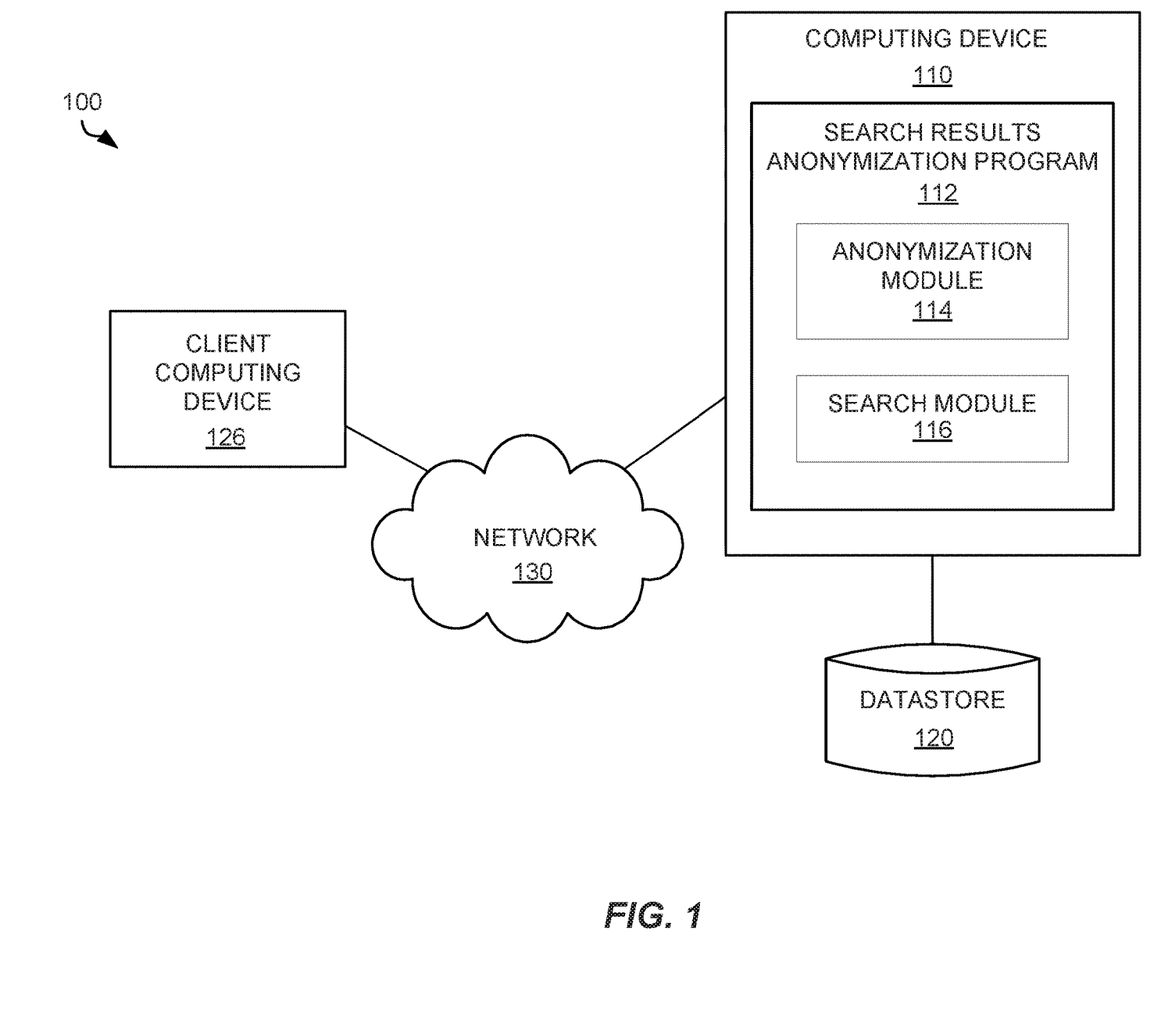
FIG. 1 is a functional block diagram of a search results anonymization environment, in accordance with an embodiment of the present invention.

FIG. 1 is a functional block diagram of a search results anonymization environment 100, in accordance with an embodiment of the present invention. Search results anonymization environment 100 includes computing device 110, datastore 120, and client computing device 126, all interconnected via network 130. Computing device 110 represents the computing system or platform that hosts search results anonymization program 112. In various embodiments, computing device 110 may be a laptop computer, netbook computer, personal computer (PC), desktop computer, server, or any programmable electronic device capable of hosting search results anonymization program 112, in accordance with embodiments of the invention. Computing device 110 may include internal and external hardware components, as depicted and described in further detail with reference to FIG. 7. FIG. 1 provides only an illustration of one implementation and does not imply any limitations with regard to the environments in which different embodiments of the invention may be implemented. Modifications to the depicted environment may be made by those skilled in the art without departing from the scope of the invention as recited by the claims.

Network 130 can be, for example, a local area network (LAN), a telecommunications network, a wide area network (WAN), such as the Internet, a virtual local area network (VLAN), or any combination that can include wired, wireless, or optical connections. In general, network 130 can be any combination of connections and protocols that will support communications between computing device 110, datastore 120, client computing device 126, and the operation of search results anonymization program 112, in search results anonymization environment 100, in accordance with embodiments of the present invention.

Client computing device 126 may be a server computer, a mobile computing device, such as a laptop, a tablet, a smartphone, or a personal digital assistant (PDA) device, or any programmable electronic device capable of interfacing with computing device 110, in accordance with embodiments of the present invention.

Figure 7:
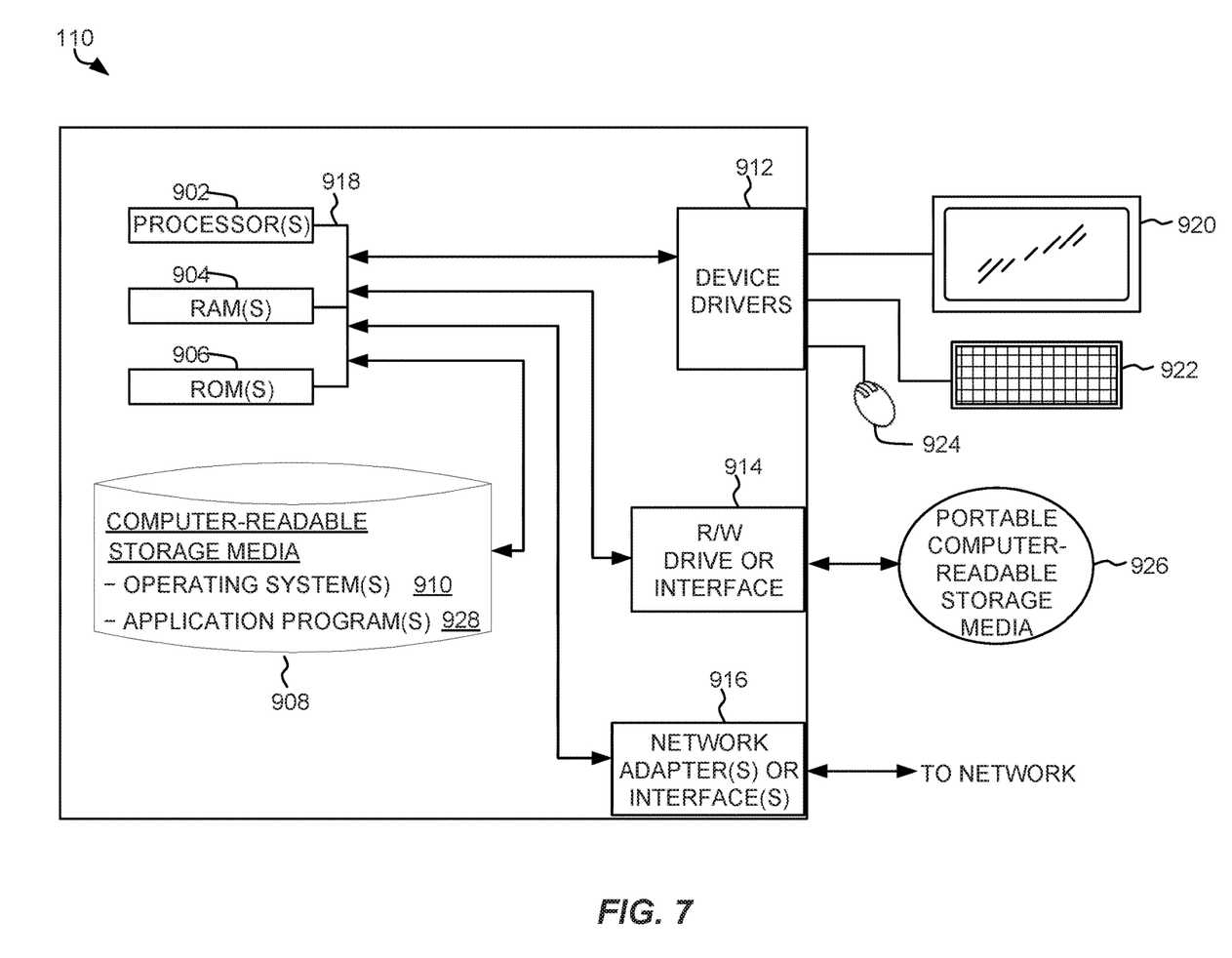
FIG. 7 is a functional block diagram illustrating a data processing environment, in accordance with an embodiment of the present invention.

Datastore 120 represents a store of data, which may include the results of searches based on input keywords, as well as product feedback. The data stored in datastore 120 may include text, videos, images, etc. Datastore 120 may be unstructured data or may be included in a database, or may be a file stored in a file storage device on a local or remote system. Datastore 120 may also store intermediate data generated by search results anonymization program 112, as described in further detail below. Datastore 120 may reside, for example, on computer readable storage media 908 (FIG. 7).

In an exemplary embodiment of the invention, computing device 110 includes search results anonymization program 112, which may further include anonymization module 114 and search module 116, which perform various tasks associated with anonymizing search results.

Search results anonymization program 112 operates generally to receive from a user a set of keywords associated with a product or service and to generate and present an anonymized list of products or services that match the keywords, in accordance with an embodiment of the invention. The user may then select one or more of the unbranded items from the product list to link to further product information about the goods or services presented. The user may also selectively reveal the brands of items in the anonymized list, for example by clicking on a hyperlink.

In accordance with an embodiment of the present invention, anonymization module 114 operates generally to receive keywords associated with a product and generate for each keyword an associated high frequency token list, a list of terms that are closely related to the keyword, based on the frequency of occurrence of these terms in search results for the keyword and other terms related to the keyword, as described below. For each keyword, anonymization module 114 may designate as an anonymized keyword a term from the associated high frequency token list for that keyword. Anonymization module 114 may also build an expanded keyword matrix, which lists various combinations of terms from the high frequency token lists associated with the input keywords, for use in anonymized product searches.

The keywords received by anonymization module 114 may include keywords that identify, characterize, or categorize the product, and specs, or features, the product should have. The keywords may, for example, have been entered by a user in a graphical or voice user interface on client computing device 126 and sent via network 130 to computing device 110.

Figure 2:
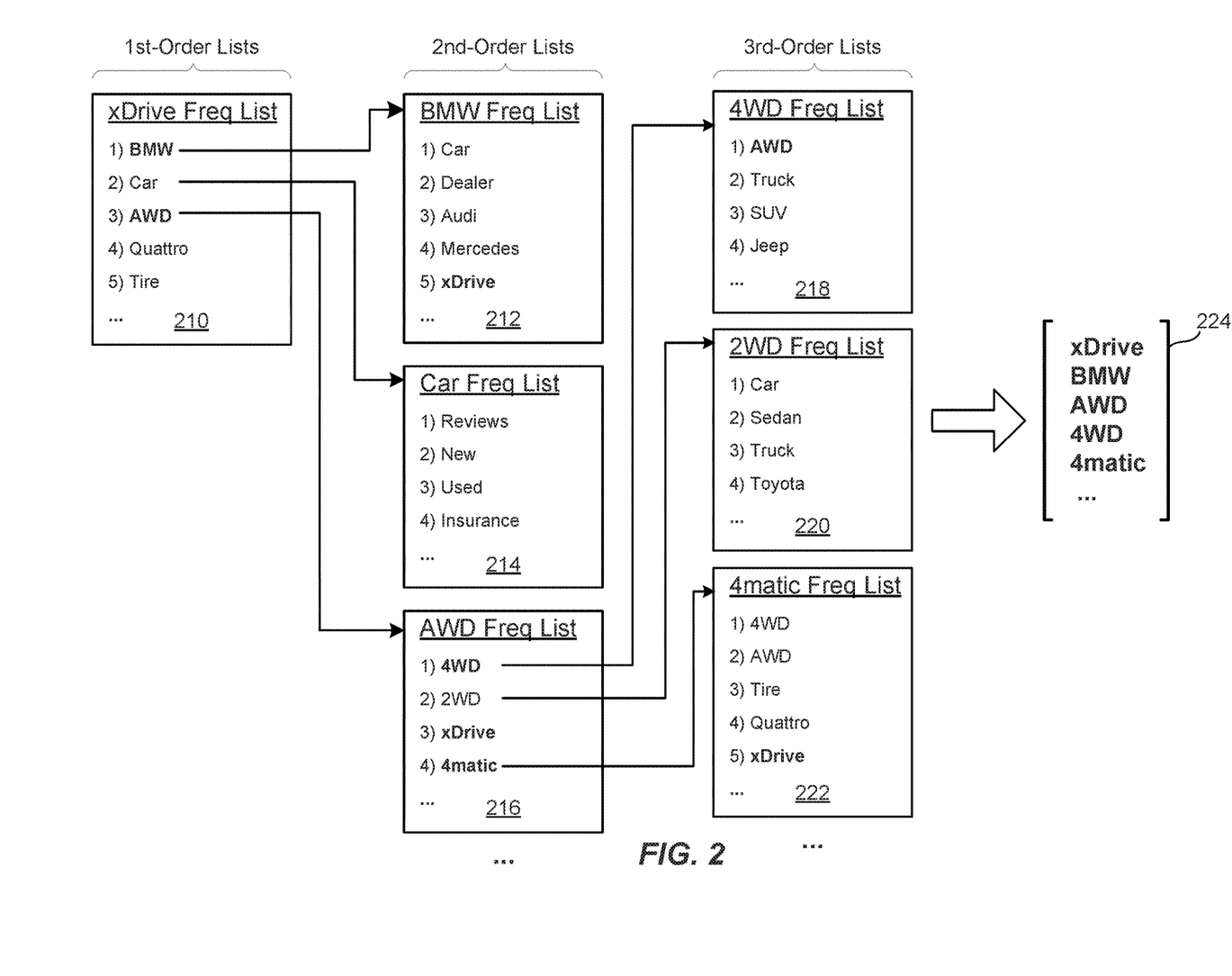
FIG. 2 is an example illustrating creating an associated high frequency token list for an input keyword from multi-order frequency lists, in accordance with an embodiment of the present invention.
Figure 3:
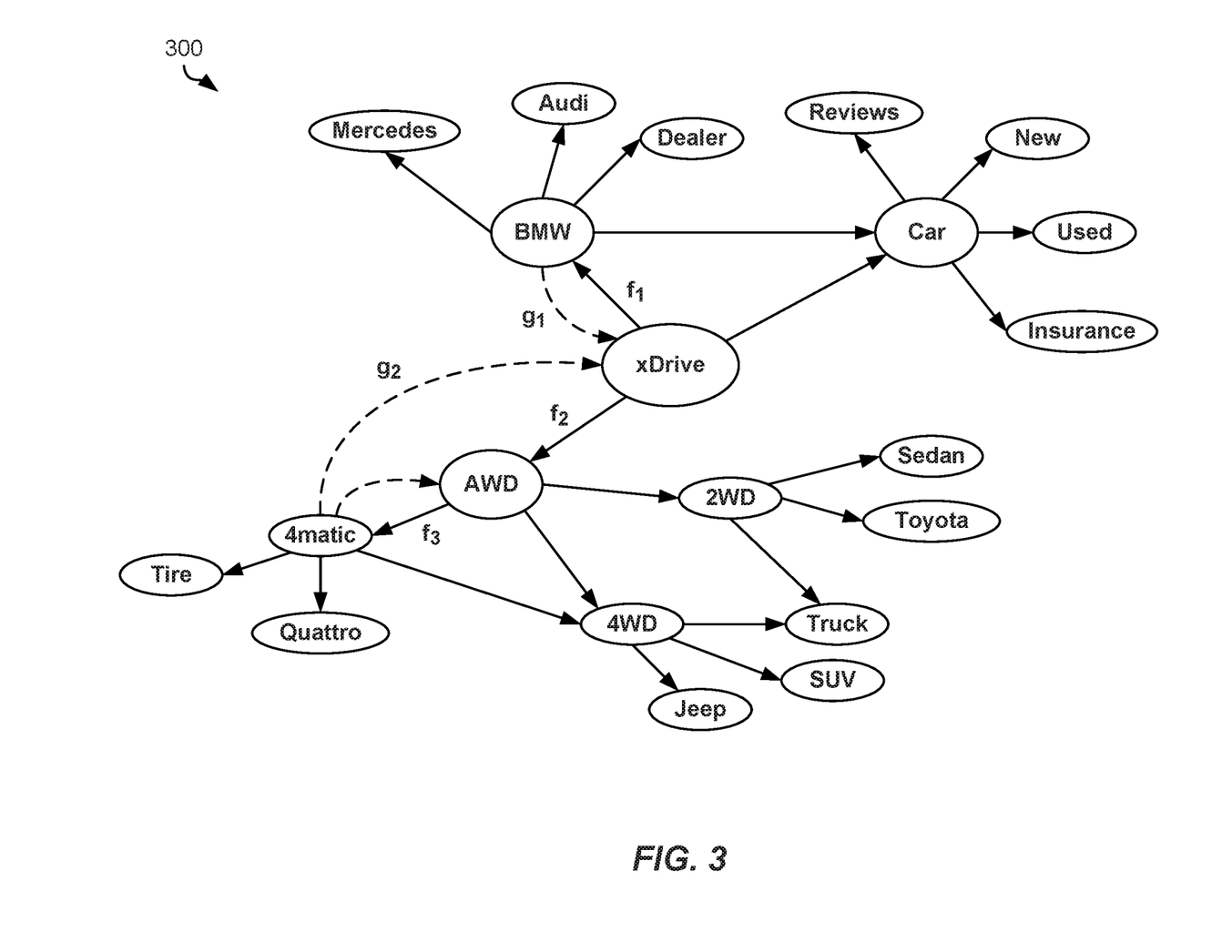
FIG. 3 represents a relationship map, in accordance with an embodiment of the present invention.

Anonymization module 114 may anonymize the keywords, as illustrated in FIGS. 2 and 3 and described diagrammatically in FIGS. 6A and 6B, as explained in more detail below, so that they are generally applicable to similar products, regardless of brand. For example, anonymization module 114 may substitute generic or representative terms for product brand names and individually branded product features. In an embodiment of the invention, anonymization module 114 may anonymize multiple brand names by replacing them with a single brand name.

To this end, for each keyword received by anonymization module 114, it first performs a search, for example by invoking search module 116. The search results may be processed using methods of NLP. For example, tokenization and POS tagging (e.g., into nouns, verbs, adjectives, proper nouns, pronouns) may be performed on the search results. Stop words and other irrelevant terms may be eliminated. In some embodiments, all tokens except those whose part of speech corresponds to that of the keyword (e.g., nouns and proper nouns if the keyword is a noun) may be eliminated. In some embodiments, NER may be used to eliminate tokens corresponding to proper nouns. Using the remaining tokens, anonymization module 114 generates a first order frequency list, tagged by the input keyword, which includes tokens that appear most frequently among the remaining tokens, listed in order of their frequency of occurrence. For example, all tokens whose relative frequency exceeds a specified threshold may be listed, where the relative frequency is the frequency of occurrence divided by the number of the remaining tokens. Alternatively, a predefined number of the highest frequency tokens may be listed. Anonymization module 114 may additionally record the total number of tokens remaining after NLP processing of the initial search results and the frequency of each token, or the relative frequency of each token in the frequency list.

In various embodiments of the invention, anonymization module 114 may employ topic modeling to assign a product category to the input keywords, by applying it to search results for the keyword. The product category may, for example, be included in subsequent searches as an additional keyword. The product category may also aid in eliminating extraneous terms from search results. For this purpose, various methods are available, based, for example, on semantic similarity or on machine learning classification.

Anonymization module 114 may initialize an associated high frequency token list for each of the input keywords. The input keyword may be included in the associated high frequency token list. The associated high frequency token lists may provide anonymized keywords and may be used to generate an expanded keyword matrix for use in anonymized product searches, as described in further detail below.

For each token in the first order frequency list for a particular keyword, anonymization module 114 may perform a further search and NLP processing, as described above, to generate a second order frequency list, each list tagged by, i.e., associated with, the token in the first order frequency list. The second order frequency lists are scanned to determine if the input keyword appears with high frequency in one or more of the lists. In an embodiment of the invention, a token may be considered as appearing with high frequency in a frequency list if it appears among the first k items in the frequency list, when the frequency list is in descending order of frequency, where k is a predetermined number (e.g., the first 5 or the first 10 items). Alternatively, a token may be considered as appearing with high frequency in a frequency list if, for example, its relative frequency is at least a specified percentage, for example, 0.1% or 1%. If the input keyword appears with high frequency in a frequency list, the token used to generate the frequency list (i.e., its tag) may be added to the high frequency token list associated with the input keyword.

In various embodiments, anonymization module 114 may continue as above and generate frequency lists of successively higher order; i.e., third order, fourth order, etc., each one tagged by a token in a lower order frequency list. For example, anonymization module 114 may continue this process to a predetermined frequency list order, or until a predetermined number of entries in the associated high frequency token list for the input keyword have been chosen.

In some embodiments, anonymization module 114 may require that a prescribed minimum number of tokens remain after NLP processing of search results in order to generate a frequency list.

Anonymization module 114 may select a high frequency token from the associated high frequency token list as an anonymized keyword, i.e., a representative token for the input keyword. In some embodiments, the anonymized keyword may refer to a branded product or feature. Anonymization module 114 may store the associated high frequency token list and the anonymized keyword in datastore 120 for subsequent processing.

In another embodiment, anonymization module 114 may select an anonymized keyword for an input keyword from a database residing on datastore 120 that includes tokens which have been used previously as anonymized keywords in anonymized searches.

FIG. 2 illustrates an example of generating an associated high frequency token list, based on input keywords related to a product, in accordance with an embodiment of the invention. FIG. 2 illustrates an example of multi-order frequency lists with three orders. For example, a user may be interested in an SUV with xDrive, the marketing name for the all-wheel drive system found in certain BMW vehicles. The user may enter the keywords SUV and xDrive into search results anonymization program 112. FIG. 2 depicts how the branded feature name xDrive may be processed by anonymization module 114. Anonymization module 114 performs a search with search query xDrive and applies NLP to the search results to generate a first order xDrive frequency list 210, as described above, which lists tokens related to xDrive based on their frequency of occurrence in the tokens remaining after processing. xDrive frequency list 210 includes the highest frequency tokens BMW, Car, AWD (all-wheel drive), Quattro, Tire, etc. For each term in first order xDrive frequency list 210, a further search and NLP processing are performed to generate a second order frequency list, of which three are illustrated: BMW frequency list 212, Car frequency list 214, and AWD frequency list 216. For example, Car frequency list 214 includes the high frequency tokens Reviews, New, Used, Insurance, etc. Anonymization module 114 determines that the term xDrive does not appear with high frequency in Car frequency list 214, but does appear with high frequency in BMW frequency list 212 and AWD frequency list 216, so BMW and AWD are added by anonymization module 114 to associated high frequency token list 224, for the input keyword xDrive, which initially only contained xDrive.

Anonymization module 114 then generates a third order frequency list for all tokens in any second order frequency list (except for xDrive and other tokens that have already been searched for in other frequency lists) in which the input keyword xDrive appears with high frequency. For example, since xDrive appears among the first few entries in second order AWD frequency list 216, each of the other high order tokens in this frequency list may give rise to a third order frequency list, e.g., 4matic frequency list 222 (tokens in second order BMW frequency list 212 would also generate third order frequency lists, though this is not shown in FIG. 2). FIG. 2 shows example third order frequency lists 218, 220, and 222, corresponding to the high frequency tokens 4WD, 2WD, and 4matic in AWD frequency list 216. Anonymization module 114 may determine that the term xDrive appears with high frequency in 4matic frequency list 222 and add 4matic to associated high frequency token list 224.

In certain embodiments of the invention, anonymization module 114 may also select a token in a frequency list for inclusion in the corresponding associated high frequency token list if that token ultimately refers back to the corresponding first order frequency list or to an intermediate frequency list in which the input keyword appears with high frequency. For example, in FIG. 2, although the input keyword xDrive does not appear with high frequency in third order 4WD frequency list 218, the token 4WD may be included in associated high frequency token list 224 because it contains the token AWD with high frequency and thus refers back to second order AWD frequency list 216 (from which 4WD frequency list 218 was generated), which does include the input keyword xDrive with high frequency. Similarly, a token may be included in an associated high frequency token list if it appears in a frequency list whose tag appeared in a frequency list whose tag appeared in a frequency list, and so on, back to a first order frequency list or to an intermediate frequency list in which the input keyword appeared with high frequency.

FIG. 3, which is discussed further below, may aid in illustrating this process. FIG. 3 partially illustrates the relationships between an input keyword and tokens that appear with high frequency in the multi-order frequency lists of FIG. 2, in the form of a directed graph referred to as a relationship map. The nodes of the graph represent certain frequency lists and are labeled with the tags of those frequency lists. A node is connected by an edge to another node if the frequency list it represents contains a token that is the label of the other node, i.e., the tag of the frequency list it represents, as described below. Relationship map 300 may be thought of as representing the process that generated associated high frequency token list 224, the output of the process shown in FIG. 2. The central node, containing the input keyword xDrive, connects via edges represented as solid arrows to nodes containing AWD, BMW, and Car, three of the tokens that appear in first order frequency list 210, which generate the second order frequency lists shown in FIG. 2. In general, a solid arrow may connect a node representing a frequency list of lower order with one of higher order. An edge represented by a dashed arrow may connect a node representing a frequency list of higher order containing a particular token to a node of lower order labeled by that token. Dashed arrows can be followed all the way back to the input keyword. For example, in FIG. 3 a dashed arrow connects the 4WD node with the AWD node, which in turn is connected by a dashed arrow to the xDrive node. This indicates that the token AWD appears with high frequency in third order 4WD frequency list 218, which was generated by second order AWD frequency list 216, which was generated by first order xDrive frequency list 210.

In embodiments of the present invention, entries in an associated high frequency token list for an input keyword are listed in order of an assigned relationship strength with the input keyword. Various schemes may be employed for this purpose. For example, the relationship strength for a token may be based on the order of the frequency list, tagged by the token, in which the input keyword appears (i.e., second order, third order, etc.) and on the height of the input keyword in the tagged frequency list (i.e., first, second, third, etc.). Tokens tagging lower order frequency lists would bear a stronger relationship to the input keyword than tokens tagging higher order frequency lists; and for tokens tagging frequency lists of the same order, those in which the input keyword appears higher up in the list would bear a stronger relationship to the input keyword than those in which the input keyword appears further down.

For example, in FIG. 2, if associated high frequency token list 224 were ordered according to this scheme, the tag AWD would have a stronger relationship to the input keyword xDrive than the tag BMW, and would therefore be listed above BMW.

In various embodiments of the invention, the strength of the relationship between an entry in an associated high frequency token list and the corresponding input keyword may be based on relative frequencies of tokens along an edge path in a relationship map representing the associated high frequency token list from the input keyword to the entry and back to the input keyword.

This may be explained with the aid of the relationship map 300 of FIG. 3, which is derived from the example frequency lists of FIG. 2. Relationship map 300 indicates, for example, that the token BMW appears in first order xDrive frequency list 210 with relative frequency $f_1$, while the input keyword xDrive appears in second order BMW frequency list 212 with relative frequency $g_1$. In an embodiment of the invention, the strength of the relationship between BMW and xDrive may depend on the frequencies $f_1$ and $g_1$. For example, the relationship strength may be the product $f_1 \cdot g_1$ or $f(f_1) \cdot f(g_1)$, where f( ) is an increasing function, or an average or weighted average of $f_1$ and $g_1$. For example, the relationship strength may be a weighted average of frequencies $f_1$ and $g_1$ with weights inversely proportional to the order of the frequency list in which the input keyword appears (e.g., $f_1/1 + g_1/2$). Other weighting schemes involving frequencies or relative frequencies are also contemplated.

In a similar manner, the term 4matic in associated high frequency token list 224 may be assigned a relationship strength with the input keyword xDrive that depends on the relative frequency ($g_2$) of the token xDrive in 4matic frequency list 222, the relative frequency ($f_3$) of the token 4matic in AWD frequency list 216, and the relative frequency ($f_2$) of the token AWD in xDrive frequency list 210. For example, the relationship strength assigned to 4matic may be ($f_2/1 + f_3/2 + g_2/3$).

The forgoing, non-limiting examples are merely illustrative examples of methods for ordering entries in an associated high frequency token list, which may be used in embodiments of the present invention. Others are contemplated.

In an embodiment of the invention, the anonymized keyword chosen to represent an input keyword is the token in the associated high frequency token list for the input keyword with the highest relationship strength, which in some cases may be the input keyword itself.

Anonymization module 114 may store the ordered associated high frequency token lists and the anonymized keywords in datastore 120 for further processing.

In various embodiments of the invention, anonymization module 114 may generate an expanded keyword matrix based on the associated high frequency token lists for the input keywords. The entries in this matrix may provide a basis for anonymized product searches, searches based on expanding the list of input keywords. The expanded keyword matrix may list combinations of tokens selected from the associated high frequency token lists corresponding to the input keywords. For example, the entries in the expanded keyword matrix may consist of combinations of tokens, one from each associated high frequency token list. Anonymization module 114 may store the expanded keyword matrix in datastore 120 for further processing. In other embodiments, the expanded keyword matrix may include other combinations of anonymized keywords and/or other terms related to the input keywords.

Figure 4:
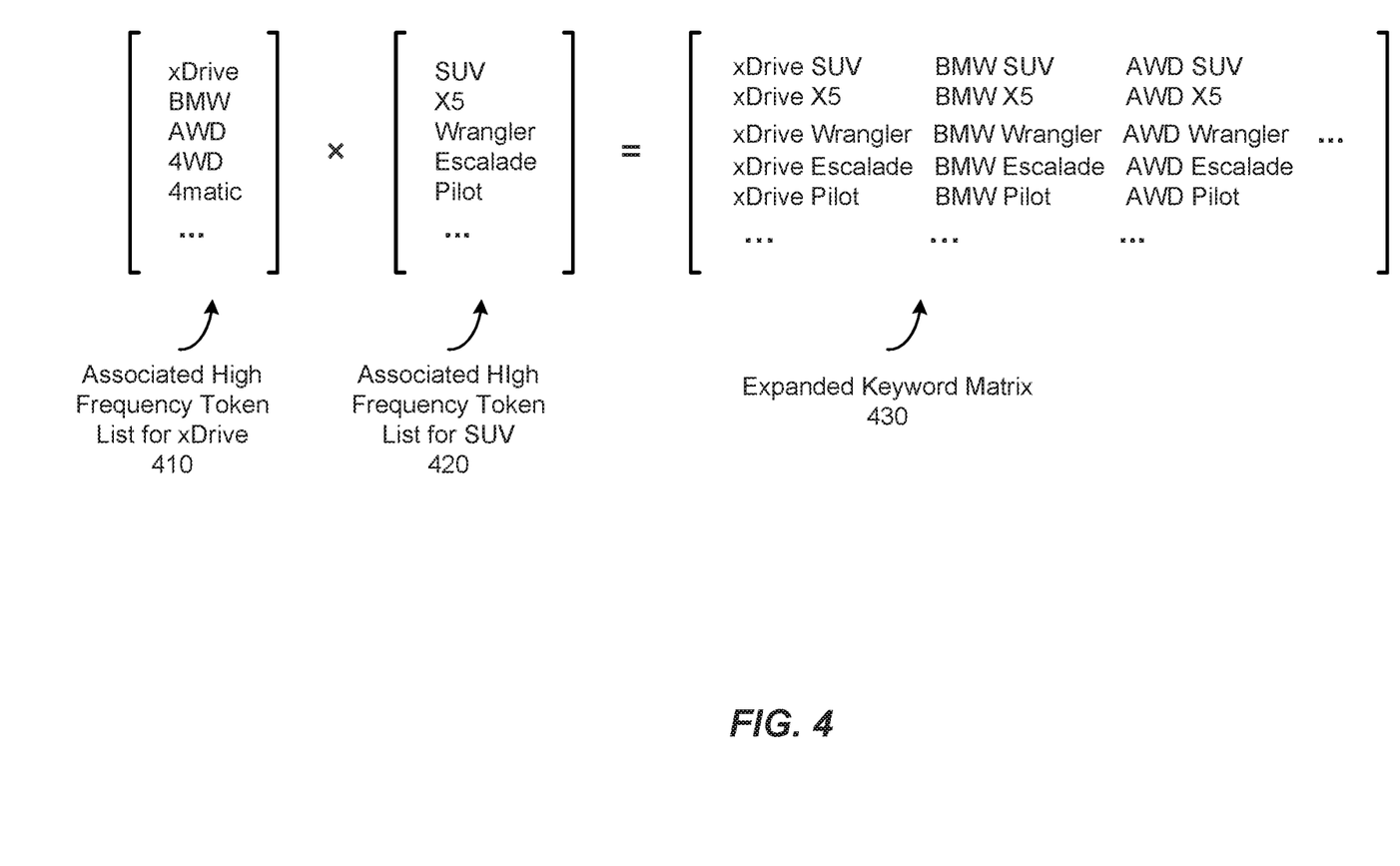
FIG. 4 is an example illustrating creating an expanded keyword matrix from input keywords, in accordance with an embodiment of the present invention.

FIG. 4 illustrates how anonymization module 114 may create an expanded keyword matrix from two example associated high frequency token lists. Expanded keyword matrix 430 is created by combining a first associated high frequency token list 410, generated from input keyword xDrive, and a second associated high frequency token list 420, generated from input keyword SUV. Each entry in the first associated high frequency token list 410 is paired with each entry in the second associated high frequency token list 420 to generate an entry in expanded keyword matrix 430. In FIG. 4, the operation shown as multiplication is merely a shorthand for the process of combining the two lists as just described. FIG. 4 illustrates the process of generating an expanded keyword matrix from just two associated high frequency token lists. In the case of more than two associated high frequency token lists, each entry in the corresponding expanded keyword matrix may correspond to a choice of one keyword from each of the associated high frequency token lists.

Search module 116 operates generally to perform an online search for products, based on the expanded keyword matrix, i.e., an anonymized search, in accordance with an embodiment of the present invention. Search module 116 may receive an expanded keyword matrix directly from anonymization module 114 or from datastore 120. Based on the keywords in the matrix, search module 116 finds relevant products and masks the product brands, as well as branded individual features. For example, product brands and branded features may simply be redacted, or they may be replaced with generic or representative names. The generic or representative names may be the anonymized keywords that were selected from the associated high frequency token lists generated by anonymization module 114 via multi-order frequency mapping, as illustrated in FIG. 2. Generic or representative names may also be retrieved from a database stored on datastore 120. As an example, "AWD SUV" may be substituted for "xDrive X5." In some embodiments, search module 116 may additionally perform an online search for feedback on the products found, for example, by searching for reviews, news articles, forum posts, blog entries, micro-blog posts, social media discussions, etc., related to the products, and extracting text portions. Search module 116 may generate a list of the feedback items found and may store a list of the products along with the associated feedback items in datastore 120. Search module 116 may store a second list of products and associated feedback in datastore 120, with product and feature branding masked.

In an embodiment of the invention, feedback may include video, e.g., reviews on video sharing websites such as YouTube, or audio, e.g., podcasts, that has been converted to text via a speech recognition or speech to text conversion tool. A variety of such software tools are available, including Dragon Professional Individual, from Nuance Communications.

Figure 5:
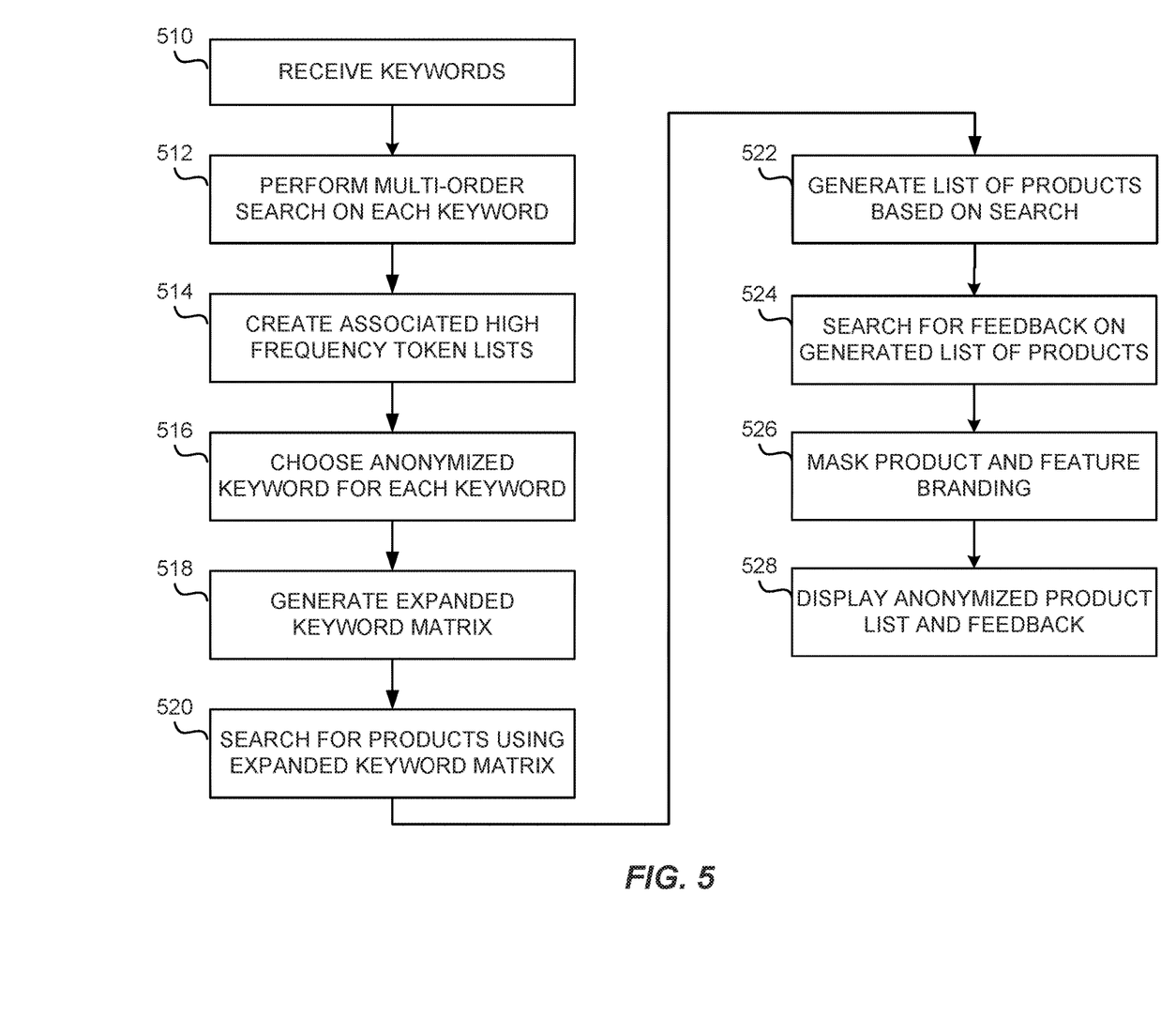
FIG. 5 is a flowchart depicting operational steps of a search results anonymization program, in accordance with an embodiment of the present invention.

FIG. 5 is a flowchart depicting operational steps performed by computing device 110 in executing search results anonymization program 112, in accordance with an embodiment of the invention. Search results anonymization program 112 receives a set of keywords associated with a product, including keywords that serve to identify or categorize the product and keywords related to product features (step 510). Anonymization module 114 performs a multi-order search on each keyword (step 512) to generate associated high frequency token lists (step 514), from which an anonymized keyword is chosen (step 516). This process is described in detail with reference to FIGS. 6A and 6B, below. Anonymization module 114 generates an expanded keyword matrix (see example in FIG. 4), which includes various combinations of tokens from the associated high frequency token lists (step 518). Search module 116 searches for products using the expanded keyword matrix (step 520) and generates a product list, based on the search results (step 522). Search module 116 searches for feedback on the products in the generated product list (step 524). Search module 116 masks the branding of products and features in the generated product list and the feedback (step 526) and displays the anonymized list of products and feedback (step 528).

Figure 6A:
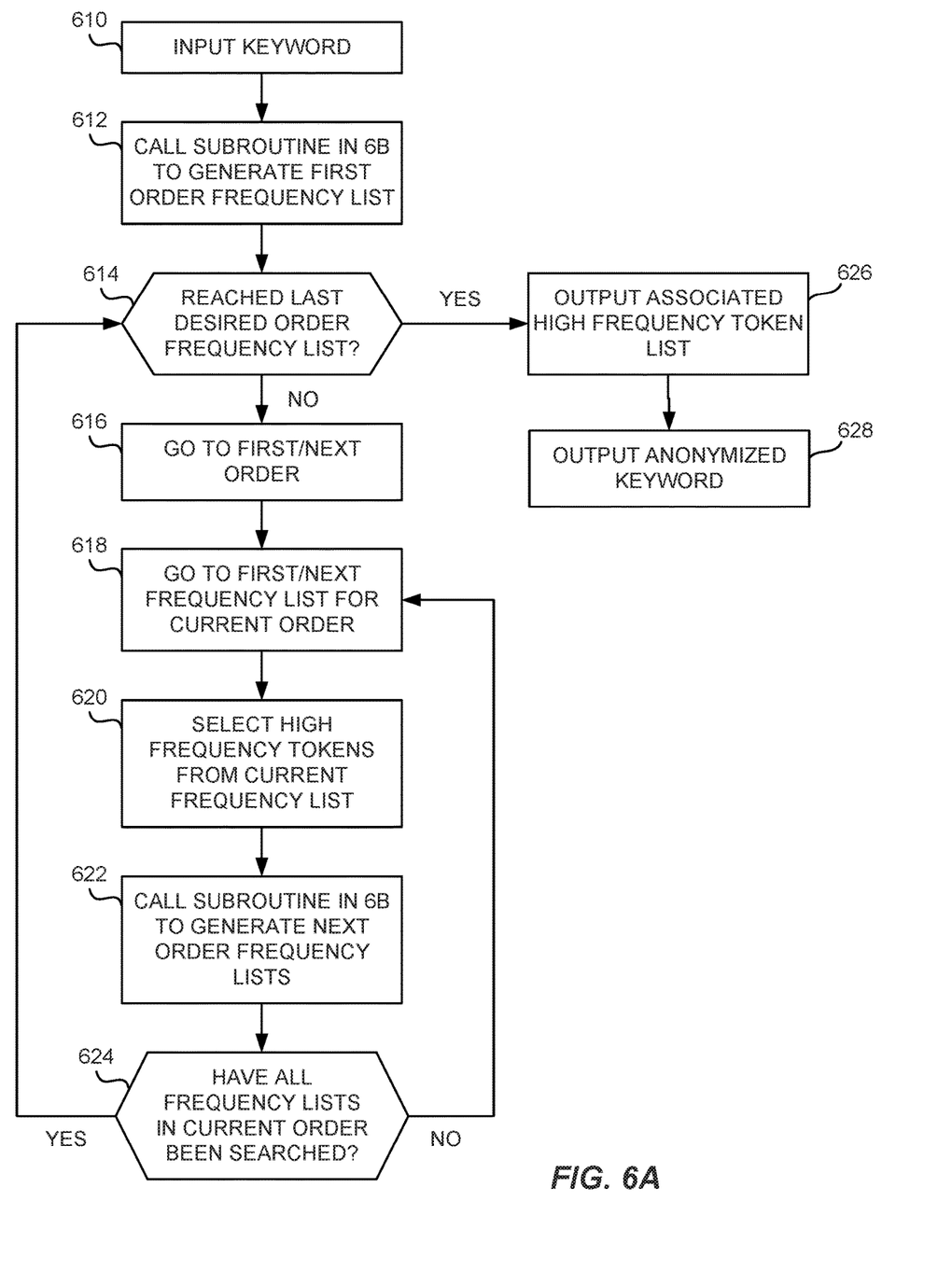
FIGS. 6A and 6B are flowcharts depicting further operational steps of a search results anonymization program, in accordance with an embodiment of the present invention.
Figure 6B:
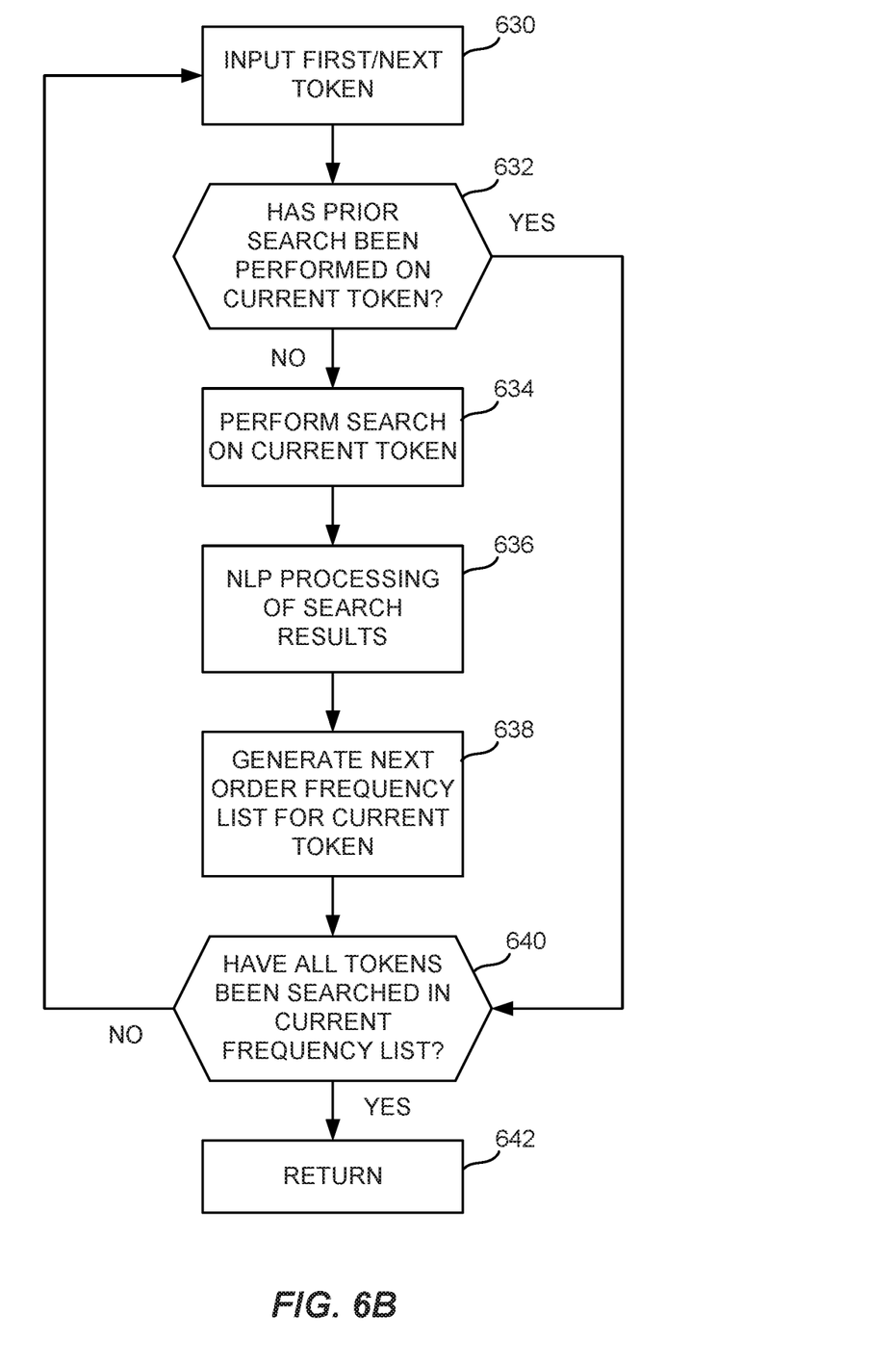

FIGS. 6A and 6B are flowcharts depicting various operational steps performed by computing device 110 in executing anonymization module 114 of search results anonymization program 112, in accordance with an embodiment of the invention. In FIG. 6A, anonymization module 114 receives a keyword from a set of keywords related to a product (step 610). A subroutine, various steps of which are depicted in FIG. 6B (discussed below), is then called to generate a first order frequency list (step 612). A decision is then made as to whether or not the highest desired order for multi-order frequency lists has been reached (step 614). The desired order could be preprogrammed before starting the search (e.g., three orders), or a decision can be made whether an additional order is needed based on the tokens and their frequencies that would populate the associated high frequency token list at that time. If the last desired order has not been reached (decision step 614, 'No' branch), the next order set of frequency lists is processed (step 616). Note that the first order frequency list will be processed on the first pass in step 616. Focus will then be shifted to individual frequency lists for the current order, selecting the first frequency list on the first pass (step 618). High frequency tokens will be selected from the current frequency list under focus (step 620). A certain number of high frequency tokens may be selected (e.g., the top 10 tokens), or a threshold frequency value may be set (e.g., tokens that appear with a frequency of at least 20), or a relative threshold frequency may be set (e.g., tokens that appear with a relative frequency of at least 1%). The subroutine depicted in FIG. 6B is called once again to generate the next order frequency lists from the current frequency list (step 622). A decision is then made as to whether all frequency lists in the current order have been searched (step 624). If not (decision step 624, 'No' branch), processing in anonymization program 112 continues at step 618, with focus shifted to the next frequency list in the current order. Steps 618 through 624 are processed recursively until all frequency lists in the current order have been searched. Once all frequency lists in the current order have been searched (decision step 624, 'Yes' branch), anonymization program 112 proceeds to step 614. If the last desired order has been reached (decision step 614, 'Yes' branch), the multi-order frequency lists may be used to generate and output an associated high frequency token list for the initial keyword, as illustrated in FIGS. 2 and 3 (step 626). A single token may then be chosen from the associated high frequency token list as an anonymized keyword (step 628).

FIG. 6B depicts a subroutine that includes various steps in processing a frequency list to generate a higher level frequency list. The subroutine in FIG. 6B may be called multiple times, recursively, in the flowchart depicted in FIG. 6A, and takes as a parameter a single frequency list. The subroutine begins by selecting the first token in the input frequency list (step 630). A decision is then made as to whether or not the current token has already been searched (step 632). If the current token has already been searched (decision step 632, 'Yes' branch), processing continues at step 640, described below. If the token has not yet been searched (decision step 632, 'No' branch), a search is performed on the current token (step 634). NLP processing is performed on the search results (step 636). The tokens output from the NLP processing are then ordered and form a next order frequency list (step 638). A decision is then made as to whether all the tokens in the input frequency list have been searched (step 640). If all the tokens have not yet been searched (decision step 640, 'No' branch), anonymization program 112 loops back to step 630 and selects the next token. If all tokens in the input frequency list have been searched (decision step 640, 'Yes' branch), the subroutine ends and control returns to the point in anonymization program 112 that initially called the subroutine (step 642).

The process depicted in FIGS. 6A and 6B is illustrated, in part, in FIG. 2 for the example keyword xDrive.

In an embodiment of the invention, the keyword anonymization process involving multi-order frequency lists described above may be applied to additional terms, which were not included in the initial set of keywords. For example, certain branded product features for products in the generated product list may be processed in this way. The additional terms may be selected, for example, from lists of features or specs on product websites, or from feedback on a product. The additional anonymized terms may then be used, for example, to expand the product search, or in masking branded product features in the feedback.

FIG. 7 depicts a block diagram of components of a computing device 110, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

Computing device 110 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 928, for example, search results anonymization program 112, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 914 to read from and write to one or more portable computer readable storage media 926. Application programs 928 on computing device 110 may be stored on one or more of the portable computer readable storage media 926, read via the respective R/W drive or interface 914 and loaded into the respective computer readable storage media 908.

Computing device 110 may also include a network adapter or interface 916, such as a TCP/IP adapter card or wireless communication adapter (such as a 4G wireless communication adapter using OFDMA technology). Application programs 928 on computing device 110 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The present invention may be a system, a method, and/or a computer program product at any possible technical detail level of integration. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A computer-implemented method for anonymizing results of a product search, comprising:
    receiving, by a first computer from a second computer, over a network, via a user interface on the second computer, two or more keywords related to a product;
    determining, by the first computer, for each of the keywords, a first list of first terms as a result of performing first searches on each of the keywords;
    determining, by the first computer, for each of the first terms, a second list of second terms as a result of performing second searches on each of the first terms;
    generating, by the first computer, for each keyword of the two or more keywords, an associated list of terms, which lists the keyword and one or more of the first terms that are closely related to the keyword based on the keyword appearing with at least a predetermined frequency in the second list of second terms for the first terms, the one or more of the first terms being limited to a predefined number to the first terms having highest occurrence frequencies;
    creating, by the first computer, a combination list that includes combinations of terms selected from the associated lists of terms, wherein each combination includes two or more terms and at least one combination includes terms from different associated lists of terms;
    receiving, by the first computer, online content, in response to further searches based on the combinations of terms in the combination list;
    generating, by the first computer, a first list of products based on product information in the received online content;
    generating, by the first computer, an anonymized list of products, from the first list of products, by masking product brand names of the products in the first list of products; and
    transmitting by the first computer over the network, for presentation on the user interface on the second computer, the first list of products and the anonymized list of products.

2. The method of claim 1, wherein each of the two or more keywords related to the product is selected from the set consisting of:
    a keyword that identifies the product, a keyword that characterizes the product, a keyword that categorizes the product, and a keyword that specifies a product feature.

3. The method of claim 1, wherein the combination list consists of combinations of terms selected one from each associated list of terms.

4. The method of claim 1, wherein generating, by the first computer, an anonymized list of products, from the first list of products, by masking product brand names of the products in the first list of products, comprises, for each product in the first list of products:
    in response to the product not having a brand name, including the product in the anonymized list; and
    in response to the product having a brand name, performing one of:
        including the product in the anonymized list, with the brand name redacted; or
        including the product in the anonymized list, with the brand name replaced with a term selected from an associated list of terms for a keyword that corresponds to the brand name.

5. The method of claim 1, wherein the transmitting by the first computer via the network, for presentation on the user interface on the second computer, the first list of products and the anonymized list of products further comprises configuring the anonymized list of products with hyperlinks that link a product in the anonymized list of products with product branding masked to a corresponding product in the first list of products with product branding unmasked.

6. The method of claim 1, wherein generating, by the first computer, the associated list of terms, which includes the keyword and one or more of the first terms that appear with at least the predetermined frequency in the second searches comprises:
    initializing the associated list of terms by including the keyword;
    performing the first searches with the keyword as search query;
    processing results of the first searches to eliminate terms that are irrelevant to the product search;
    selecting, for a first order frequency list, terms with a highest relative frequency of occurrence among the processed results; and
    generating frequency lists of successively higher order, up to a specified order, by:
        for each term in the current one of the order frequency lists, generating a next order frequency list by:
            performing an online search with the term as search query;
            processing results of the online search to eliminate stop words;
            selecting for the next order frequency list terms with a highest relative frequency of occurrence among the processed search results; and
            in response to the keyword appearing in the next order frequency list:
                adding to the associated list of terms for the keyword the term from the current order frequency list.

7. The method of claim 6, wherein generating frequency lists of successively higher order, up to a specified order comprises at least one of:
    generating frequency lists of successively higher order up to a predetermined order; or
    generating frequency lists of successively higher order up to a predetermined number of entries in the associated list of terms for the keyword.

8. The method of claim 6, wherein selecting for the next order frequency list terms with the highest relative frequency of occurrence among the processed search results comprises at least one of:
    ordering terms in the processed search results according to descending frequency of occurrence among the terms in the processed search results and selecting the first k terms, where k is a predetermined number; and
    selecting terms whose relative frequency of occurrence among the terms in the processed search results exceeds a predetermined threshold.

9. The method of claim 6, wherein processing results of the online search to eliminate terms that are irrelevant to the product search comprises:
    tokenizing the search results;
    performing part-of-speech (POS) tagging of the tokens; and
    removing stop words.

10. The method of claim 1, further comprising:
    receiving, by the first computer, in response to a search for each product in the first list of products, a first list of feedback items associated with the product;

generating, by the first computer, for each product in the first list of products, an anonymized list of feedback items, which includes feedback items in the first list of feedback items associated with the product, wherein each feedback item has branding masked; and transmitting by the first computer over the network, for presentation on the user interface on the second computer, for each product in the first list of products, the corresponding first list of feedback items and the corresponding anonymized list of feedback items.

11. The method of claim 10, wherein the feedback items associated with the product include text portions extracted from one or more of:

product reviews, news articles, forum posts, blog entries, social media discussions, and micro blog posts.

12. The method of claim 10, wherein generating, for each product in the first list of products, an anonymized list of feedback items, which includes feedback items in the first list of feedback items associated with the product, wherein each feedback item has branding masked, comprises, for each feedback item in the first list of feedback items associated with the product:

identifying brand names in the feedback item and including the feedback item in the anonymized list of feedback items, whereby, for each brand name identified, one of the following is performed:
the brand name is redacted; or
the brand name is replaced with a term selected from an associated list of terms for a keyword that corresponds to the brand name.

13. A computer system comprising:

one or more computer processors, one or more computer-readable storage media, and program instructions stored on one or more of the computer-readable storage media for execution by at least one of the one or more processors, the program instructions comprising:

program instructions to receive from a second computer, over a network, via a user interface on the second computer, two or more keywords related to a product;

program instructions to determine, for each of the keywords, a first list of first terms as a result of performing first searches on each of the keywords;

program instructions to determine, for each of the first terms, a second list of second terms as a result of performing second searches on each of the first terms;

program instructions to generate, for each keyword of the two or more keywords, an associated list of terms, which lists the keyword and one or more of the first terms that are closely related to the keyword based on the keyword appearing with at least a predetermined frequency in the second list of second terms for the first terms, the one or more of the first terms being limited to a predefined number to the first terms having highest occurrence frequencies;

program instructions to create a combination list that includes combinations of terms selected from the associated lists of terms, wherein each combination includes two or more terms and at least one combination includes terms from different associated lists of terms;

program instructions to receive online content, in response to further searches based on the combinations of terms in the combination list;

program instructions to generate a first list of products based on product information in the received online content;

program instructions to generate an anonymized list of products, from the first list of products, by masking product brand names of the products in the first list of products; and program instructions to transmit over the network, for presentation on the user interface on the second computer, the first list of products and the anonymized list of products.

14. The computer system of claim 13, wherein each of the two or more keywords related to the product is selected from the set consisting of:

a keyword that identifies the product, a keyword that characterizes the product, a keyword that categorizes the product, and a keyword that specifies a product feature.

15. The computer system of claim 13, wherein the combination list consists of combinations of terms selected one from each associated list of terms.

16. The computer system of claim 13, wherein program instructions to generate an anonymized list of products, from the first list of products, by masking product brand names of the products in the first list of products, comprises, for each product in the first list of products:

program instructions, in response to the product not having a brand name, to include the product in the anonymized list; and program instructions, in response to the product having a brand name, to perform one of:
including the product in the anonymized list, with the brand name redacted; or
including the product in the anonymized list, with the brand name replaced with a term selected from an associated list of terms for a keyword that corresponds to the brand name.

17. The computer system of claim 13, wherein program instructions to transmit via the network, for presentation on the user interface on the second computer, the first list of products and the anonymized list of products further comprise program instructions to configure the anonymized list of products with hyperlinks that link a product in the anonymized list of products with product branding masked to a corresponding product in the first list of products with product branding unmasked.

18. The computer system of claim 13, wherein program instructions to generate the associated list of terms, which includes the keyword and one or more of the first terms that appear with at least the predetermined frequency in the second searches comprise computer instructions to:

initialize the associated list of terms by including the keyword;

perform the first searches with the keyword as search query;

process results of the first searches to eliminate terms that are irrelevant to the product search;

select, for a first order frequency list, terms with a highest relative frequency of occurrence among the processed results; and generate frequency lists of successively higher order, up to a specified order, by:

for each term in the current one of the order frequency lists, generating a next order frequency list by:

performing an online search with the term as search query;

processing results of the online search to eliminate stop words;

selecting for the next order frequency list terms with a highest relative frequency of occurrence among the processed search results; and in response to the keyword appearing in the next order frequency list:

adding to the associated list of terms for the keyword the term from the current order frequency list.

19. The computer system of claim 18, wherein program instructions to generate frequency lists of successively higher order, up to a specified order comprise program instructions to perform at least one of:

generating frequency lists of successively higher order up to a predetermined order; or generating frequency lists of successively higher order up to a predetermined number of entries in the associated list of terms for the keyword.

20. The computer system of claim 18, wherein program instructions to select for the next order frequency list terms with the highest relative frequency of occurrence among the processed search results comprise program instructions to perform at least one of:

ordering terms in the processed search results according to descending frequency of occurrence among the terms in the processed search results and selecting the first k terms, where k is a predetermined number; and selecting terms whose relative frequency of occurrence among the terms in the processed search results exceeds a predetermined threshold.

* * * * *